Figure 1:
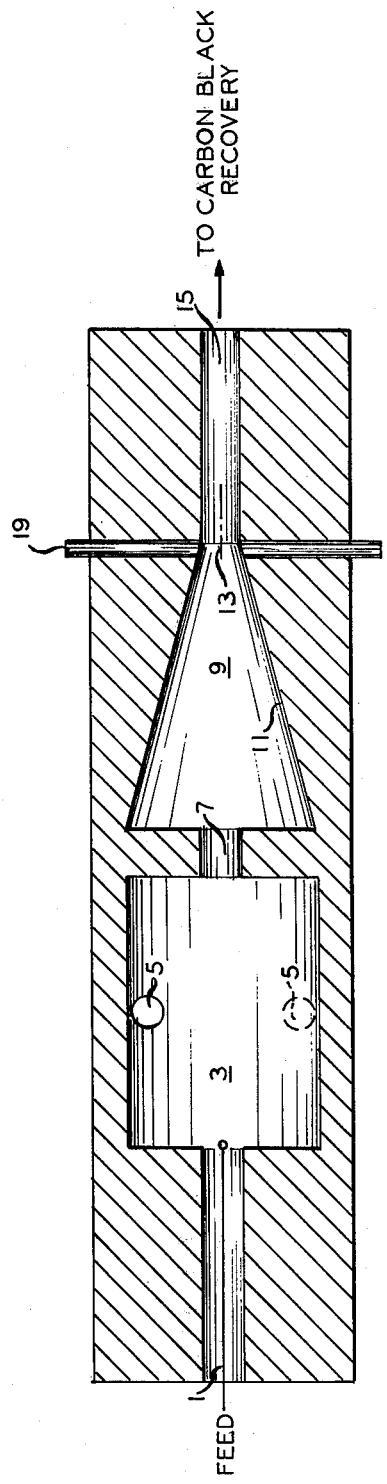

United States Patent [19]
Vanderveen et al.

[11] 4,127,387
[45] Nov. 28, 1978

[54] RADIAL SECONDARY GAS FLOW CARBON BLACK REACTOR

[75] Inventors: John W. Vanderveen; King L. Mills, both of Bartlesville, Okla.

[73] Assignee: Phillips Petroleum Company, Bartlesville, Okla.

[21] Appl. No.: 718,301

[22] Filed: Aug. 27, 1976

[51] Int. Cl.$^2$ ............................................. C01B 31/02
[52] U.S. Cl. .................................. 422/158; 423/450; 423/456; 110/263; 431/8
[58] Field of Search ............... 23/259.5; 423/450, 456; 110/28 F; 431/8

[56] References Cited
U.S. PATENT DOCUMENTS

| | | | |
|---|---|---|---|
| 3,333,928 | 8/1967 | Kobayashi | 23/259.5 X |
| 3,642,446 | 2/1972 | Heller et al. | 23/259.5 X |
| 3,984,528 | 10/1976 | Cheng et al. | 23/259.5 X |

Primary Examiner—James H. Tayman, Jr.

[57] ABSTRACT

An apparatus is provided for producing a carbon black with a tint residual below −6. The apparatus entail introducing feedstock axially and generating a hot combustion gas vortex in a cylindrical precombustion section of a tubular carbon black reactor, producing a first mixture of feedstock and combustion gases, passing this mixture through an abruptly restricted passage axially connected to the precombustion section, abruptly expanding the first mixture into a frustoconical venturi converging section of the reactor with mixing of this first mixture with an additional flow of combustion gas at the exit of the converging section with the combustion gas entering the converging section in opposite, radial flow thereby forming a second mixture which is admitted into a reaction section of the carbon black reactor.

3 Claims, 2 Drawing Figures

U.S. Patent

Nov. 28, 1978

4,127,387

RADIAL SECONDARY GAS FLOW CARBON BLACK REACTOR

BACKGROUND OF THE INVENTION

This invention relates to the production of carbon black. In one of its aspects this invention relates to the production of carbon black with a tint residual below -6. In another of its aspects this invention relates to carbon black reactors.

It is important to reduce the heat buildup, also called hysteresis, or rubber/carbon black compositions. Hysteresis is a measurement of how much of the elastic deformation energy put into a carbon black/rubber composition remains in the composition as heat after the deformation forces have been released. Serious accidents have been attributed to the failure of tires made from high hysteresis rubber compositions. The higher the heat buildup in the rubber compositions the greater are the chances the tires made from such compositions can be destroyed in use.

It has recently been set forth in copending application, Ser. No. 681,977, filed Apr. 30, 1976, incorporated herein by reference, that a rubber composition exhibiting low heat buildup along with satisfactory tread wear properties is provided in a composition comprising 100 parts by weight of rubber and 30 to 120 parts by weight of a carbon black having a tint residual of about -6 or less. Tint residual is a property of carbon black defined by the following formula:

$$TR = T - [56.0 + 1.057 (CTAB) - 0.002745 (CTAB)^2 - 0.2596 (DBP) - 0.201 (N_2SA - CTAB)].$$

In this formula, the abbreviations used have the following meanings and the properties are measured as described:

TR: This is tint residual.
CTAB: This is the surface area of the carbon black measured as described by J. Janzen and G. Kraus in Rubber Chemistry and Technology, 44, 1287 (1971), $m^2/gm$.
$N_2SA$: This is the surface area of the carbon black measured using nitrogen, in accordance with the ASTM method D-3037-71T, $m^2/gm$.
DBP: This is the structure of the carbon black in cc/100 g and is measured in accordance with U.S. Pat. No. 3,548,454 and, after crushing, by method B in accordance with ASTM D-2414-70. This property is also referred to as 24M4 DBP.
T: This is the tint or tinting strength of the carbon black measured by arbitrarily assigning the reference black IRB No. 3 the value of 100; the tint is measured in accordance with ASTM 3265-75.

It is therefore an object of this invention to provide an apparatus suitable for preparing carbon black having a tint residual of −6 or less. It is another object of this invention to provide a method for producing carbon black having a tint residual of −6 or less.

Other aspects, objects, and the various advantages of this invention will become apparent upon study of this specification, the drawings, and the appended claims.

STATEMENT OF THE INVENTION

According to this invention an apparatus is provided for the preparation of carbon black. In this apparatus, described as a tubular carbon black reactor, is a cylindrical precombustion section having axially aligned inlet for feedstock and means for generating a hot combustion gas vortex. The precombustion section is axially aligned and openly connected in operative communication with a passage of abruptly restricted dimensions, with this passage in further axial alignment and openly connected in operative communication with a frustoconical, venturi converging section which abruptly expands from the passage to a diameter equal to that of the precombustion section. The venturi converging section extends away from the passage at a converging angle of about 10° to about 30° between the frustoconical surface and the reactor axis and the converging section terminates openly connected in operative communication with an axially aligned reaction tube section which has a diameter equal to the least diameter of the converging section. In the converging section at the inlet to the reaction tube section are means for introducing radial and opposing streams of combustion gas into the reactor. The mixing action resulting from the placement of the entry of radially, opposing combustion gas streams into a reactor capable of producing a well mixed flow of combustion gas and carbon black feedstock will be shown herein to contribute to the production of carbon black having a low tint residual.

In accordance with another embodiment of the invention a method is provided for producing carbon black having a tint residual of about −6 or less in which carbon black feedstock is axially passed into a cylindrical precombustion section of a carbon black reactor while a vortex of hot combustion gas is generated in the precombustion section thereby producing a first mixture of feedstock and combustion gases that is passed from the precombustion section axially through an abruptly restricted passage and abruptly expanded. The expanded mixture then is passed through a frustoconical venturi converging section thereby converging the axially flowing mixture and at the exit of the converging section mixing the first mixture with radial, opposite flow of combustion gas to form a second mixture. Carbon black is then produced from the second mixture in a confined reaction section of the carbon black reactor.

The invention can best be understood in conjunction with the drawing in which

Figure 2:
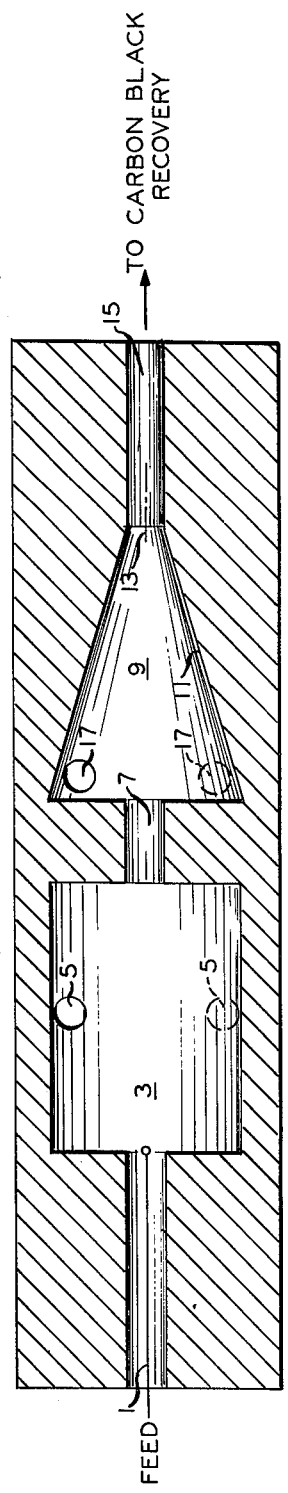

FIG. 1 is a cut-away view of a carbon black reactor of the present invention and FIG. 2 is a cut-away view of a carbon black reactor of the prior art.

In the FIGURES the reactors are identical with the exception of the location of the entry for supplemental combustion gas in the frustoconical, venturi converging section. In FIG. 1 this supplemental combustion gas is supplied by opposing radial tubes preferably located near the outlet of the converging section and in FIG. 2, which depicts the prior art apparatus, the supplemental combustion gas is supplied tangentially into the converging section, preferably in the portion having the greatest diameter where a mixture of gases has been abruptly expanded into the venturi converging section of the reactor.

Referring now to FIG. 1 or FIG. 2, like numbers will be used to designate portions of the apparatus that are duplicated in the two FIGURES. Feed enters with axial flow through inlet means 1 to be mixed in a cylindrical precombustion section 3 with combustion gases fed into precombustion section 3 through tangential inlet means 5 so that the axially flowing feedstock is mixed with a vortex of hot combustion gases to form a first mixture of feedstock and combustion gases. This first mixture then flows through a passage of abruptly restricted dimensions 7 which is axially aligned with both the feedstock inlet and the cylindrical precombustion section. The first mixture is discharged into a frustoconical, venturi converging section 9 which abruptly expands to a diameter equal to that of the precombustion section 3. The converging section 9 extends away from the restricted passage 7 at a converging angle of about 10° to about 30° between the frustoconical surface 11 and the axis of the reactor 13. The converging section 9 terminates in open communication with an axially aligned reaction tube section 15 which has a diameter equal the least diameter of the converging section.

Apparatuses for the production of carbon black constructed as described above are well known in the art. Also known is the introduction of supplemental combustion gases through tangential flow means 17 located in the venturi converging section 9. In the present invention supplemental combustion gas is introduced into the venturi converging section 9 through opposed, radial flow means 19 preferably located near the termination of the converging section 9 into the reaction tube 15.

The dimensions of the reaction apparatus according to this invention can range from a cylindrical precombustion section having a diameter about 4 inches up to about 40 inches and an axial length from about 3 inches up to about 12 inches with the length shorter than the diameter. Depending upon the dimensions of the precombustion section the abruptly restricted dimensions of the outlet passage will range from about ½ inch up to about 16 inches in diameter. The converging section will generally have its greatest diameter equal to that of the precombustion secton and as it extends away from the restricted passage connecting it to the precombustion chamber will converge at an angle ranging from about 10° to about 30° with the angle measured between the frustoconical surface of the converging section and the axis of the reactor. The reactor section will generally range from a diameter of about ½ inch up to about 8 inches. The inlet lines for reactor feedstock and combustion gases can be sized according to the flow that these passages carry.

In the following examples, reactor blocks were used in which the feed inlet 1 was a ½ inch diameter 4-inch line, the cylindrical precombustion section 3 was 3 inches long and had a diameter of 4 inches, tangential combustion gas inlets 5 were ¼ inch diameter, the abruptly restricted passage 4 was 1 inch long and of cross-section of an equilateral triangle circumscribed about a ½ inch diameter circle, the converging section 9 was about 4 inches long with the converging angle of about 24°, the reaction tube 15 was about ½ inch diameter and both the opposed radial, supplemental combustion gas inlets 19 of this invention and the tangential, supplemental combustion gas inlets 17 of the prior art were about ¼ inch in diameter. Flow rates and properties of the carbon black product produced in the various runs are described below in Table I.

TABLE I

| Run Numbers: | Invention Runs | | | | | | Control Runs | |
|---|---|---|---|---|---|---|---|---|
| | 1 | 2 | 3 | 4 | 5 | 6 | 7 | 8 |
| Axial Benzene[1], cc/min., Cylindrical Zone: | 5.75 | 8.0 | 15.5 | 17.2 | 17.2 | 19.2 | 14.5 | 13.0 |
| Tangential Air, SCF/min., Tangential Methane, SCF/min., Volume ratio Air to Fuel, Converging Zone: | 3.96 for all eight runs  0.314 for all eight runs  12.6/1 for all eight runs | | | | | | | |
| | Equal Flow Opposing Jet | | | | | | Tangential | |
| Air, SCF/min., | 0.30 | 2.27 | 2.27 | 2.27 | 2.27 | 2.27 | 2.27 | 2.27 |
| Methane, SCF/min., | 0 | 0.10 | 0.10 | 0.10 | 0.10 | 0.10 | 0.10 | 0.10 |
| Volume ratio Air to Fuel, | — | 22.7 | 22.7 | 22.7 | 22.7 | 22.7 | 22.7 | 22.7 |
| Carbon Black Product: | | | | | | | | |
| CTAB, m²/gm., | 154 | 112 | 83 | 67 | 70 | 62 | 65 | 63 |
| N₂SA, m²/gm., | 182 | 127 | 96 | 68 | 74 | 63 | 65 | 63 |
| I₂No., m²/gm., | 159 | 120 | 89 | 64 | 69 | 55 | 61 | 62 |
| 24M4 DBP, cc/100 gm., | 90 | 86 | 83 | 80 | 84 | 86 | 91 | 88 |
| Tint, | 115 | 102 | 87 | 79 | 80 | 76 | 75 | 78 |
| Tint Residual, | −10 | −13 | −14 | −14.5 | −13.5 | −12 | +14 | +11 |
| Photelometer Value, | — | 96 | 95 | 90 | 93 | 88 | 86 | 92 |
| Grams Product/30 min., | 37.0 | 26 | 58 | 79 | 93 | 90 | 58 | 83 |

[1] Oil outlet at upstream face of first (cylindrical) zone.

It will be noted that the tint residual of the carbon black product produced using the apparatus and method of this invention all fell in a range below −6 while the product of the control runs had a tint residual in a range well above −6.

We claim:

1. A tubular carbon black reactor comprising:
   (a) a cylindrical precombustion section having axially aligned inlet for feedstock and means for generating a hot combustion vortex;
   (b) in open communication, axial alignment, and operably connected with said precombustion section, a passage of abruptly restricted dimensions;
   (c) in open communication, axial alignment, and operably connected with said passage, a frustoconical, venturi converging section abruptly expanding to diameter equal to that of said precombustion section and extending away from said passage at a converging angle between the frustoconical surface and the reactor axis of about 10° to about 30°, said converging section terminating in open communication with an axially aligned reaction tube section;
   (d) a reaction tube section of diameter equal the least diameter of said converging section;
   (e) means for radially introducing opposing combustion gas streams into said converging section at the inlet to the reaction tube section; and
   (f) a source of combustion gas connected to supply said means of (e).

2. A tubular carbon black reactor of claim 1 wherein said cylindrical precombustion section has a diameter from about 4 inches up to about 40 inches and an axial length from about 3 inches up to about 12 inches with the length shorter than the diameter and an abruptly restricted passage from about ½ inch up to about 16 inches in diameter.

3. A carbon black reactor of claim 2 wherein said abruptly restricted passage is of equilateral triangular cross-section.

* * * * *